Figure 2:
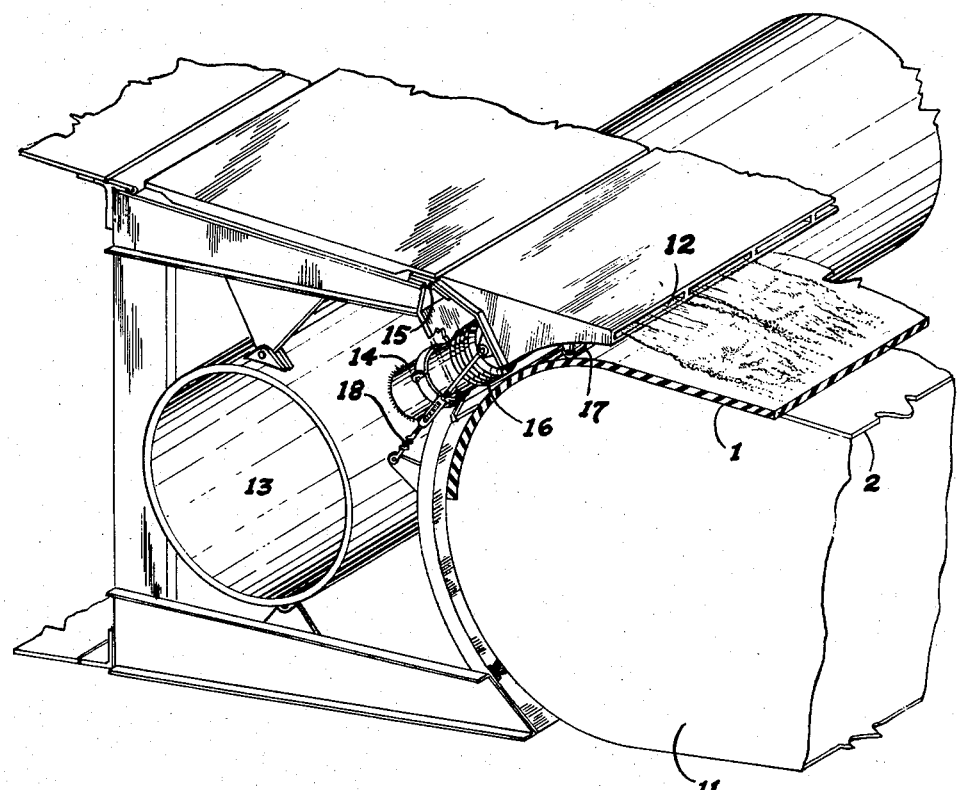

Feb. 9, 1960    L. WALLIS ET AL    2,924,537
LAMINATED THERMAL INSULATION
Filed July 22, 1957

INVENTORS.
LYLE WALLIS
WILLIAM H. WHEELER
CHARLES J. GIEMZA
BY *Julian C. Ranfro*
ATTORNEY.

United States Patent Office 2,924,537
Patented Feb. 9, 1960

2,924,537

LAMINATED THERMAL INSULATION

Lyle Wallis and William H. Wheeler, Towson, and Charles H. Giemza, Middle River, Md., assignors to The Martin Company, a corporation of Maryland Application July 22, 1957, Serial No. 673,146

9 Claims. (Cl. 117—46)

This invention relates to thermal insulation. More particularly, it relates to a laminated insulator construction adapted to withstand corrosive high temperature gases and to protect structural aircraft materials, such as aluminum, magnesium and titanium from the deleterious effect of such gases, and from the temperatures encountered in high speed flight.

Gaseous products of combustion are ordinarily high in temperature and relatively corrosive in nature, and this is especially true of the very hot and corrosive exhaust gases discharged from turbojet and turboprop aircraft engines. Many conventional materials of construction are unable to wtihstand the heat and corrosive action of such gases. In particular, the aluminum and aluminum alloys commonly employed in aircraft construction must be protected from the deleterious effect of the hot gases discharged from jet aircraft engines. Accordingly, when the design of an aircraft is such that hot exhaust gases are directed against a structural part of the aircraft ordinarily made of aluminum, it has heretofore been the practice either to replace or to shield this aluminum part wtih a heat and corrosive-resistant metal such as stainless steel that can withstand the high temperatures and cororsive action of these exhaust gases. However, stainless steel is not altogether satisfactory for the aforementioned purpose because it is relatively much heavier than the aluminum it shields or replaces, it is not a thermal insulator, and it is galvanically incompatible with aluminum and similar metals at the temperatures encountered in service with the result that corrosion and/or deformation of the aluminum substructure is very likely to occur.

Due to the many limitations and shortcomings of the aforementioned conventional materials, a great deal of effort has been directed to the development of some form of insulation or insulating material that will effectively protect aluminum and similar materials from the deleterious effect of hot exhaust gases. However, despite the importance of this problem no insulating material heretofore known or developed has been successful in meeting all of the rigorous requirements of this service. In view of the foregoing, and in an effort to solve this problem, we undertook an extensive investigation that culminated in the discovery of a new insulator or insulating material that not only has low thermal conductivity and is physically and chemically stable at the temperatures encountered in this service, but in addition can withstand the heat and corrosive nature of hot exhaust gases, is light in weight, is compatible with aluminum at the operating temperatures encountered. Moreover, our new insulating material has a rigid self-supporting structure that can be formed in any desired size and shape, thereby greatly enhancing the utility of the material.

The insulating material of our invention is a laminated structure comprising a moderately thin layer of a plastic base structure, a very thin layer of a heat-distributing metal and a very thin layer of a ceramic insulating material. Specifically our laminated thermal insulator comprises a base structure of a fiber-reinforced thermo-stable plastic material molded or otherwise formed to the size and shape required by its ultimate use, a layer of copper or equivalent metal between about 0.005" and 0.020" thick disposed on one surface of the plastic material, and a layer of a ceramic material between about 0.005" and 0.020" thick disposed on the layer of copper. The laminated thermal insulator is manufactured by molding or otherwise forming the base structure from fiber-reinforced plastic material that after curing is physically and chemically stable at a temperature at least as high as 500° F., abrading one surface of the plastic base structure to roughen this surface, applying the layer of copper to the abraded surface of the base structure by flame spraying or some equivalent technique, and applying the layer of the ceramic material to the surface of the layer of copper also by means of flame spraying or an equivalent technique.

Figure 1:
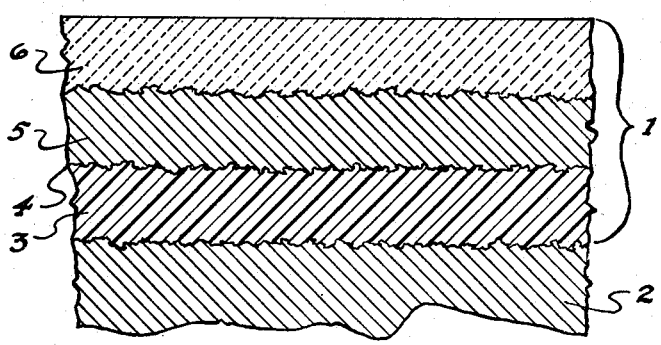

Our invention will be more fully understood from the following description of the method of making our new laminated thermal insulator, taken in conjunction with the drawings wherein:

Figure 1 is a cross-sectional view of the laminated thermal insulator of this invention, taken on line 2—2 of Figure 2; and Figure 2 illustrates the use of the present insulator on the surface of a wing flap exposed to hot exhaust gases.

A laminated structure according to this invention is indicated generally at 1 in Figure 1, affixed to an underlying structure 2, such as the metal skin of an airplane wing. The main or base structure of the insulator laminate is formed from thermo-stable plastic material 3. That is to say, both the reinforcing fibers and the cured plastic material should be physically and chemically stable (i.e., they should retain their strength, shape and structural integrity) at temperatures at least as high as 500° F. The fiber-reinforced plastic should have low thermal conductivity and as low a density as feasible, and should be compatible with aluminum at the temperatures encountered in service use. For example, the preferred thermally stable fibers useful in the manufacture of the reinforced plastic base structure of our invention are glass fibers and asbestos fibers, and the preferred thermally stable plastic materials are the so-called phenolic resins (i.e., the resinous condensation product of phenol-aldehyde and/or creosol-aldehyde) and the so-called silicone resins (i.e., the linear and three dimensional polymers of dimethylpolysiloxane and/or other polysiloxanes known to the art).

The resinous material is intimately mixed with the fibrous reinforcing material in conventional manner, and the resulting mix is molded or otherwise formed to the desired size and shape of the base structure of the laminated insulator construction. As noted, the fiber-reinforced plastic material should have as low a density as feasible; and the cured plastic material must contain as little residual volatile matter as possible in order to eliminate blistering and similar deterioration of the base structure when exposed to the high temperatures that will be encountered in service use. Accordingly, the reinforced plastic is advantageously cured at a substantially lower pressure than that normally employed, and following the curing operation the plastic material is given a post cure heat treatment at a higher temperature than those to which the base structure will be subjected after it has been placed in service. For example, the conventional curing pressure of fiber-reinforced phenolic resins is normally about 500 lbs./sq. in. However, we have found that in order to obtain a base structure having a relatively low density and minimum residual volatiles, these resins should be cured at a pressure of about 100 lbs./sq. in., and following the curing operation the plastic base structure should be subjected to prolonged heating at gradually increased temperatures culminated by heating for about one hour at about 550° F.

On completion of the curing operation and the post cure heat treatment, the surface 4 of the fiber-reinforced plastic base structure that will be subjected to the high temperature gases is prepared for the application of a layer 5 of copper thereto by roughening or abrading this surface. The bond between the layer of hopper or equivalent metal and the underlying plastic base structure is mechanical, and the surface 4 of the base structure 3 is roughened to provide a good foundation or footing to which the layer 5 of copper can tightly adhere. We presently prefer to roughen or abrade this surface by grit blasting the surface with an air supported stream of finely divided abrasive material, for example, No. 60 aluminum oxide grit. Following the roughening of the exposed surface of the plastic base structure 3 a layer 5 of copper is applied thereto, advantageously by means of a conventional flame spraying technique. The layer of copper must be sufficiently thick to provide a continuous layer having good thermal conductivity over the entire surface of the plastic base structure, thus preventing physical or structural damage to the plastic base structure and the underlying protected structure. We have found that the flame sprayed layer of copper should be between about 0.005" and 0.020" in thickness, and preferably about 0.010" thick.

Following the application of the layer of copper, a layer 6 of a ceramic insulating material is applied thereover. The ceramic material must have low thermal conductivity and a high melting point, and it must be highly resistant to the corrosive effect of high temperature exhaust gases. We presently prefer to use zirconium dioxide, which possesses the aforementioned properties to a high degree, as the ceramic insulating material. We have also successfully employed aluminum oxide for this purpose. The ceramic material 6 is advantageously applied to the layer 5 of copper by a flame spraying technique, and we have found that the ceramic material should be applied in a continuous layer between about 0.005" and 0.020" in thickness, and preferably about 0.010" thick, for effective results.

The resulting laminated structure is employed as a thermal insulator by interposing it between the source of high temperature gases and the object or structure to be protected therefrom with the layer of ceramic material of the laminate exposed to the high temperature gases. The laminate can be employed either as a layer of insulating material by applying the under surface of the plastic base structure directly to the surface of the object or structure to be protected, or as a curtain-type thermal insulator by supporting a sheet of the laminate at its edges. In order to adapt the laminated insulating structure to specific uses, the fiber-reinforced plastic base structure 3 can first be formed in any required shape or size, and the layers of copper and ceramic insulation then applied to the exposed surface thereof as hereinbefore described. For example, in an important practical application of our invention (see Figure 2), the laminated insulator 1 protects the aluminum skin 2 and underlying aluminum wing structure of an airplane wing flap 11 from the deleterious effect of hot exhaust gases that are deliberately directed against this wing flap via exhaust nozzles 12. These exhaust gases are generated, for example, by a turbine engine (not shown) which powers the aircraft. Part of the turbine exhaust is diverted through major duct 13, then through nozzle ducts 14, one of which is shown, and finally from nozzles 12. By means of hinge 15, bellows 16 and roller 17, the nozzle arrangement is adapted to follow the change in attitude of flap 11, so that the hot turbine gases issuing from nozzles 12 may be continuously directed over the upper surface of the flap. A spring loaded rod 18 connecting nozzles 12 and the stationary portion of the wing provides tension so that roller 17 follows flap 11.

In this application the reinforced plastic base structure is initially molded in sheet form to conform to the curved shape of the wing flap 11, and after the layers of copper and ceramic insulation have been applied thereto pursuant to our invention, the undersurface of the curved plastic base structure is bonded directly to the surface of the aluminum wing flap being protected from the effect of hot exhaust gases directed thereagainst.

The following example is illustrative but not limitative of the method of making the laminated thermal insulator, and of the laminate product, according to our invention:

A conventional mixture of uncured phenol-aldehyde resin and asbestos fiber reinforcing material was prepared, and a layer or sheet of the fiber-resin mixture was molded and cured at a pressure of 100 pounds per square inch and at a temperature of 250° F. to form a fiber-reinforced plastic base structure approximately .165" thick. The resulting sheet of fiber-reinforced plastic was then given a post cure heat treatment comprising heating the plastic for 4 hours at each 50° increment between 250° F. and 350° F., heating it for 16 hours at 400° F., and finally heating it for 1 hour at 550° F. One surface of the resulting asbestos-phenol plastic base structure was then grit-blasted with No. 60 aluminum oxide abrasive to roughen this surface and thus provide a good foundation or footing for the layer of copper subsequently applied thereto. A coating of copper 0.010" thick was then flame-sprayed on to the roughened surface of the plastic base structure, and then a coating of zirconium dioxide 0.010" thick was applied over the copper coating also by means of flame spraying. The resulting laminated insulating material was bonded to the surface of an aluminum panel, and a stream of hot combustion gas having a temperature of about 800° F. was then directed against the exposed zirconium oxide surface of the insulator for a period of 9 minutes. The temperature at the interface of the zirconium dioxide layer and the copper layer reached a maximum of 545° F. at the end of the heating period, and the temperature at the interface of the fiber-reinforced plastic base structure and the aluminum panel reached a value of 220° F. at the end of 4½ minutes and leveled off at a maximum temperature of 230° F. at the end of the 9 minute heating period.

We claim:

1. The method of making a laminated thermal insulator which comprises forming a base structure of thermo-stable fiber-reinforced plastic material, abrading one surface of said base structure to roughen said surface, applying a layer of copper to said abraded surface of the base structure, said layer of copper being between about .005" and .020" thick, and applying a layer of ceramic insulating material to the surface of the layer of copper, said layer of ceramic material being between about .005" and .020" thick.

2. The method of making a laminated thermal insulator which comprises forming a base structure of thermo-stable fiber-reinforced plastic material, heating said plastic base structure to a temperature at least as high as the maximum temperature to which the base structure will be heated in subsequent use, abrading one surface of said base structure to roughen said surface, applying a layer of copper between about 0.005" and 0.020" thick to said abraded surface of the base structure, and applying a layer of ceramic material selected from the group consisting of zirconium dioxide and aluminum oxide to the surface of said layer of copper, said layer of ceramic material being between about 0.005" and 0.020" thick.

3. The method of making a laminated thermal insulator which comprises forming a base structure of thermo-stable fiber-reinforced plastic material, heating said plastic base structure to a temperature of at least 500° F., abrading one surface of said base structure to roughen said surface, applying a layer of copper between about 0.005" and 0.020" thick to said abraded surface of the base structure, and applying a layer of ceramic material selected from the group consisting of zirconium dioxide and aluminum oxide to the surface of said layer of copper, said layer of ceramic material being between about 0.005" and 0.020" thick.

4. The method of making a laminated thermal insulator which comprises forming a base structure of thermally-stable fiber-reinforced plastic material, said reinforcing fibers being selected from the group consisting of asbestos fibers and glass fibers and said thermally-stable plastic material being selected from the group consisting of phenol-aldehyde, creosol-aldehyde and polysiloxane resins, directing a gas supported stream of finely divided abrasive material against one surface of said base structure to abrade and roughen said surface, applying a layer of copper between about 0.005" and 0.020" thick to the abraded surface of said base structure, and applying a layer of a ceramic material selected from the group consisting of zirconium dioxide and alumina to said layer of copper, said ceramic material being between about 0.005" and 0.020" thick.

5. The method of making a laminated thermal insulator which comprises forming a base structure of thermally-stable fiber-reinforced plastic material, said reinforcing fibers being selected from the group consisting of asbestos fibers and glass fibers and said thermally-stable plastic material being selected from the group consisting of phenol-aldehyde, creosol-aldehyde and polysiloxane resins, heating said fiber-reinforced plastic base structure to at least 500° F. for a period of time sufficient to effect evolution of substantially all volatile matter therefrom, directing a gas supported stream of finely divided abrasive material against one surface of said base structure to abrade and roughen said surface, applying a layer of copper by means of flame spraying to the abraded surface of said base structure, said layer of copper being about 0.010" thick, and applying a layer of a ceramic material selected from the group consisting of zirconium dioxide and alumina to said layer of copper, said ceramic material being applied by flame spraying and being about 0.010" thick.

6. The method of making a laminated thermal insulator which comprises forming a mixture of thermally-stable reinforcing fibers selected from the group consisting of asbestos fibers and glass fibers and an uncured thermally-stable plastic material selected from the group consisting of phenol-aldehyde, creosol-aldehyde and polysiloxane resins, molding and curing a layer of said mixture to form a thermally-stable fiber-reinforced plastic base structure, heating said fiber-reinforced plastic base structure to at least 500° F. for a period of time sufficient to effect evolution of substantially all volatile matter therefrom, abrading one surface of said base structure to roughen said surface, applying a layer of copper about 0.010" thick to the abraded surface of said base structure, said layer of copper being applied to said surface by means of flame spraying, and applying a layer of a ceramic material selected from the group consisting of zirconium dioxide and alumina to said layer of copper, said ceramic material being about 0.010" thick and being applied to said layer of copper by means of flame spraying.

7. A laminated thermal insulator comprising a base structure of thermally-stable fiber-reinforced plastic material, a layer of copper between about 0.005" and 0.020" thick firmly bonded to one surface of said base structure and a layer of a ceramic insulating material between about 0.005" and 0.020" thick firmly bonded to said layer of copper.

8. A laminated thermal insulator comprising a thermally-stable fiber-reinforced plastic base structure, the reinforcing fibers of said base structure being selected from the group consisting of asbestos fibers and glass fibers and the thermally stable plastic of said base structure being selected from the group consisting of phenol-aldehyde, creosol-aldehyde and polysiloxane resins, a layer of copper about 0.010" in thickness tightly bonded to one surface of said fiber-reinforced plastic base structure, and a layer of a ceramic insulating material selected from the group consisting of zirconium dioxide and alumina tightly bonded to said layer of copper, said layer of ceramic material being about 0.010" thick.

9. A laminated thermal insulator comprising a thermally stable fiber-reinforced plastic base structure, the reinforcing fibers of said base structure being selected from the group consisting of asbestos fibers and glass fibers and the thermally stable plastic of said base structure being selected from the group consisting of phenol aldehyde, creosol aldehyde and polysiloxane resins, a layer of copper about 0.010" in thickness tightly bonded to one surface of said fiber-reinforced plastic base structure, and a layer of a ceramic insulating material selected from the group consisting of zirconium dioxide and alumina tightly bonded to said layer of copper, said layer of ceramic material being about 0.010" thick, the fiber-reinforced plastic base structure having been heated to at least 500° F. for a period of time sufficient to effect evolution of substantially all volatile matter therefrom prior to application of the layer of copper thereto.

References Cited in the file of this patent
UNITED STATES PATENTS

| | | |
|---|---|---|
| 510,340 | Hines | Dec. 5, 1893 |
| 1,977,639 | Langdon | Oct. 23, 1934 |
| 2,157,456 | Koyemann | May 9, 1939 |

FOREIGN PATENTS

| | | |
|---|---|---|
| 102,908 | Australia | June 20, 1938 |
| 139,657 | Australia | Dec. 7, 1950 |
| 654,304 | Great Britain | June 13, 1951 |